(12) United States Patent
Cheng et al.

(10) Patent No.: US 9,323,287 B2
(45) Date of Patent: Apr. 26, 2016

(54) TRANSFORMABLE WEARABLE ELECTRONIC DEVICE

(71) Applicant: Wistron Corporation, New Taipei (TW)

(72) Inventors: Ting-Yao Cheng, New Taipei (TW);
Yao-Wei Wang, New Taipei (TW);
Ya-Shian Huang, New Taipei (TW);
Tzu-Ting Chiu, New Taipei (TW);
Yi-Chi Li, New Taipei (TW)

(73) Assignee: Wistron Corporation, New Taipei (TW)

( * ) Notice: Subject to any disclaimer, the term of this patent is extended or adjusted under 35 U.S.C. 154(b) by 0 days.

(21) Appl. No.: 14/457,104

(22) Filed: Aug. 11, 2014

(65) Prior Publication Data

US 2015/0301558 A1    Oct. 22, 2015

(30) Foreign Application Priority Data

Apr. 16, 2014  (TW) .............................. 103113914 A (51) Int. Cl.
*G06F 1/16*         (2006.01)

(52) U.S. Cl.
CPC . *G06F 1/163* (2013.01); *G06F 1/16* (2013.01)

(58) Field of Classification Search
CPC ......... G06F 3/017; G06F 3/013; G06F 3/012; G06F 3/04842; G06F 3/0346; G06F 3/005; G06F 3/011; G06F 1/163; G06F 1/1632; G06F 1/1694; G06F 3/14; G06F 1/16

USPC .......................................... 361/679.03; 345/8
See application file for complete search history.

(56) References Cited

U.S. PATENT DOCUMENTS

| | | | | |
|---|---|---|---|---|
| 7,020,508 | B2* | 3/2006 | Stivoric ................ | A61B 5/0205 600/390 |
| 2012/0069511 | A1* | 3/2012 | Azera ..................... | G06F 1/163 361/679.03 |
| 2012/0306643 | A1 | 12/2012 | Dugan | |
| 2014/0337621 | A1* | 11/2014 | Nakhimov .............. | G06F 1/163 713/168 |

\* cited by examiner

*Primary Examiner* — Anthony Haughton
*Assistant Examiner* — Ingrid Wright
(74) *Attorney, Agent, or Firm* — Winston Hsu; Scott Margo (57) ABSTRACT

The present invention discloses a wearable electronic device having a plurality of trapezoid structures rotatably connected with one another. At least one inclined surface is formed on two ends of each trapezoid structure. When protruding sides of adjacent inclined surfaces of adjacent trapezoid structures abut against each other and sunken sides of the adjacent inclined surfaces of the adjacent trapezoid structures abut against each other, the plurality of trapezoid structures is formed in a ring shape. When the protruding sides and the sunken sides of the adjacent inclined surfaces of the adjacent trapezoid structures abut against each other, the plurality of trapezoid structures is formed in a straight shape.

10 Claims, 9 Drawing Sheets

TRANSFORMABLE WEARABLE ELECTRONIC DEVICE

BACKGROUND OF THE INVENTION

1. Field of the Invention

The present invention is to provide a transformable wearable electronic device, and more specifically, to a wearable electronic device capable of switching to a ring shape or a straight shape.

2. Description of the Prior Art

As the development of the wearable technology, wearable electronic devices, such as wearable cameras, smart watches and smart glasses, will become a mainstream product in a consumer electronic product market. A wearable electronic device can be worn comfortably near the skin, so that users can access information by the wearable electronic device, such as physiological information. However, it is hard to hold the smartphone having a large screen with one hand, especially for exceeding six inches. Furthermore, users usually have various information devices, and it is unnecessary to carry all the information devices with them when temporarily leaving a seat. For example, users only need to receive emergency calls and message notifications. Therefore, it is an important issue to design a wearable electronic device with portability and capability of combining with normal information devices.

SUMMARY OF THE INVENTION

The present invention is to provide a transformable wearable electronic device to solve the above mentioned drawbacks.

According to the disclosure, a transformable wearable electronic device includes a plurality of trapezoid structures rotatably connected with one another, and at least one inclined surface is formed on two ends of each trapezoid structure. The plurality of trapezoid structures is formed in a ring shape when protruding sides of adjacent inclined surfaces of adjacent trapezoid structures abut against each other and sunken sides of adjacent inclined surfaces of the adjacent trapezoid structures abut against each other, and the plurality of trapezoid structures being formed in a straight shape when the protruding sides and the sunken sides of the adjacent inclined surfaces of the adjacent trapezoid structures abut against each other.

According to the disclosure, the at least one engaging portion is disposed on two ends of each trapezoid structure for engaging with engaging portions of the adjacent trapezoid structures, so as to fix the plurality of trapezoid structures.

According to the disclosure, the engaging portion is an annular rib or an annular concave, and at least one positioning component is formed on the engaging portion.

According to the disclosure, the wearable electronic device further includes at least one resilient component connected with a trapezoid structure on a central portion of the plurality of trapezoid structures and a trapezoid structure on an end of the plurality of trapezoid structures.

According to the disclosure, the wearable electronic device further includes a display module installed on one of the plurality of trapezoid structures.

According to the disclosure, the plurality of trapezoid structures includes a first trapezoid structure, a second trapezoid structure, a third trapezoid structure, a fourth trapezoid structure and a fifth trapezoid structure. A first inclined surface and a second inclined surface are respectively formed on two ends of the first trapezoid structure. A third inclined surface and a fourth inclined surface are respectively formed on two ends of the second trapezoid structure, and the third inclined surface of the second trapezoid structure abuts against the first inclined surface of the first trapezoid structure. A fifth inclined surface and a sixth inclined surface are respectively formed on two ends of the third trapezoid structure, and the fifth inclined surface of the third trapezoid structure abuts against the second inclined surface of the first trapezoid structure. A seventh inclined surface is formed on an end of the fourth trapezoid structure, and the seventh inclined surface of the fourth trapezoid structure abuts against the fourth inclined surface of the second trapezoid structure. An eighth inclined surface is formed on an end of the fifth trapezoid structure, and the eighth inclined surface of the fifth trapezoid structure abuts against the sixth inclined surface of the third trapezoid structure. When protruding sides of the first inclined surface and the third inclined surface abut against each other and sunken sides of the first inclined surface and the third inclined surface abut against each other, protruding sides of the second inclined surface and the fifth inclined surface abut against each other and sunken sides of the second inclined surface and the fifth inclined surface abut against each other, protruding sides of the fourth inclined surface and the seventh inclined surface abut against each other and sunken sides of the fourth inclined surface and the seventh inclined surface abut against each other, and protruding sides of the sixth inclined surface and the eighth inclined surface abut against each other and sunken sides of the sixth inclined surface and the eighth inclined surface abut against each other, the first trapezoid structure, the second trapezoid structure, the third trapezoid structure, the fourth trapezoid structure and the fifth trapezoid structure are formed in the ring shape. When the protruding sides and the sunken sides of the first inclined surface and the third inclined surface abut against each other, the protruding sides and the sunken sides of the second inclined surface and the fifth inclined surface abut against each other, the protruding sides and the sunken sides of the fourth inclined surface and the seventh inclined surface abut against each other, and the protruding sides and the sunken sides of the sixth inclined surface and the eighth inclined surface abut against each other, the first trapezoid structure, the second trapezoid structure, the third trapezoid structure, the fourth trapezoid structure and the fifth trapezoid structure are formed in the straight shape.

According to the disclosure, engaging portions are respectively disposed on two ends of each of the first trapezoid structure, the second trapezoid structure, the third trapezoid structure and on an end of each of the fourth trapezoid structure and the fifth trapezoid structure for engaging with engaging portions of the adjacent trapezoid structures, so as to fix the first trapezoid structure, the second trapezoid structure, the third trapezoid structure, the fourth trapezoid structure and the fifth trapezoid structure.

According to the disclosure, the engaging portion is an annular rib or an annular concave, and at least one positioning component is formed on the engaging portion.

According to the disclosure, the wearable electronic device further includes at least one resilient component connected with the first trapezoid structure and the fourth trapezoid structure or the fifth trapezoid structure.

According to the disclosure, the wearable electronic device further includes a display module installed on the first trapezoid structure.

The wearable electronic device of the present invention can switch between the straight shape and the ring shape through the different connection of the plurality of trapezoid structures. The wearable electronic device can be connected with another portable electronic device as the extension peripheral device of the portable electronic device, as being formed in the straight shape. The appearance of the portable device connected with the straight-shaped wearable electronic device is formed in a rectangular shape so as to keep aesthetic feeling. In addition, the wearable electronic device can be formed in the ring shape to be a smart watch, a bracelet or an accessory for being worn on a wrist and easy carriage. The wearable electronic device of the present invention is transformable, and the competitiveness of the wearable electronic device is enhanced.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
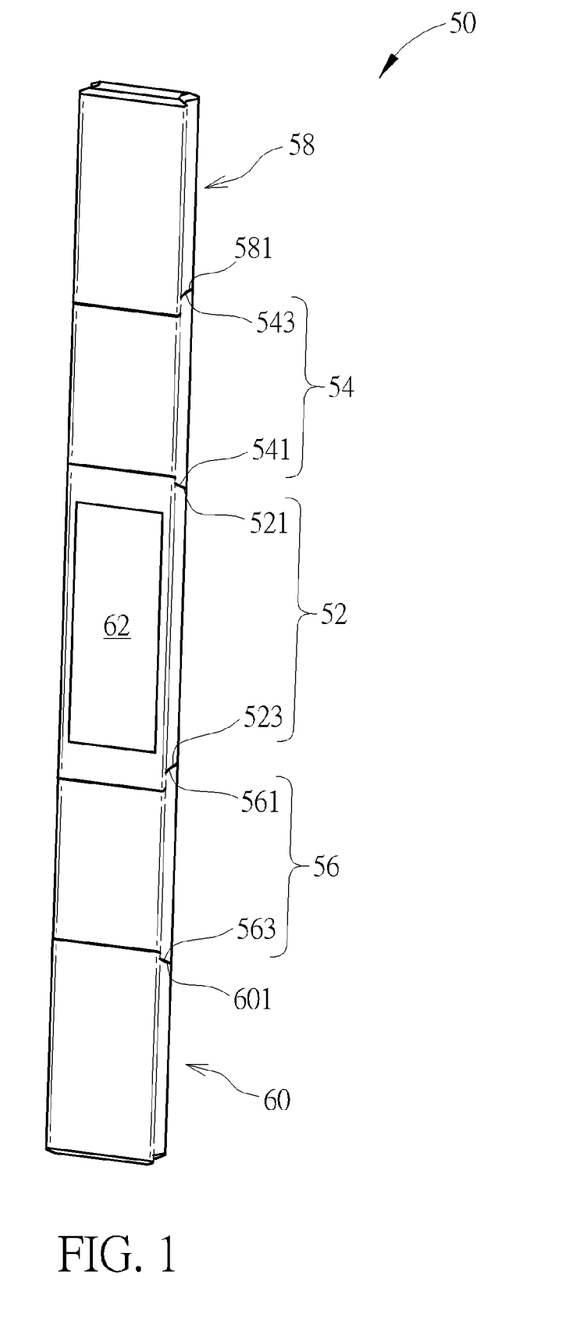
FIG. 1 and FIG. 2 are respectively a schematic diagram and a lateral view of a wearable electronic device in a using status according to an embodiment of the present invention.
Figure 2:
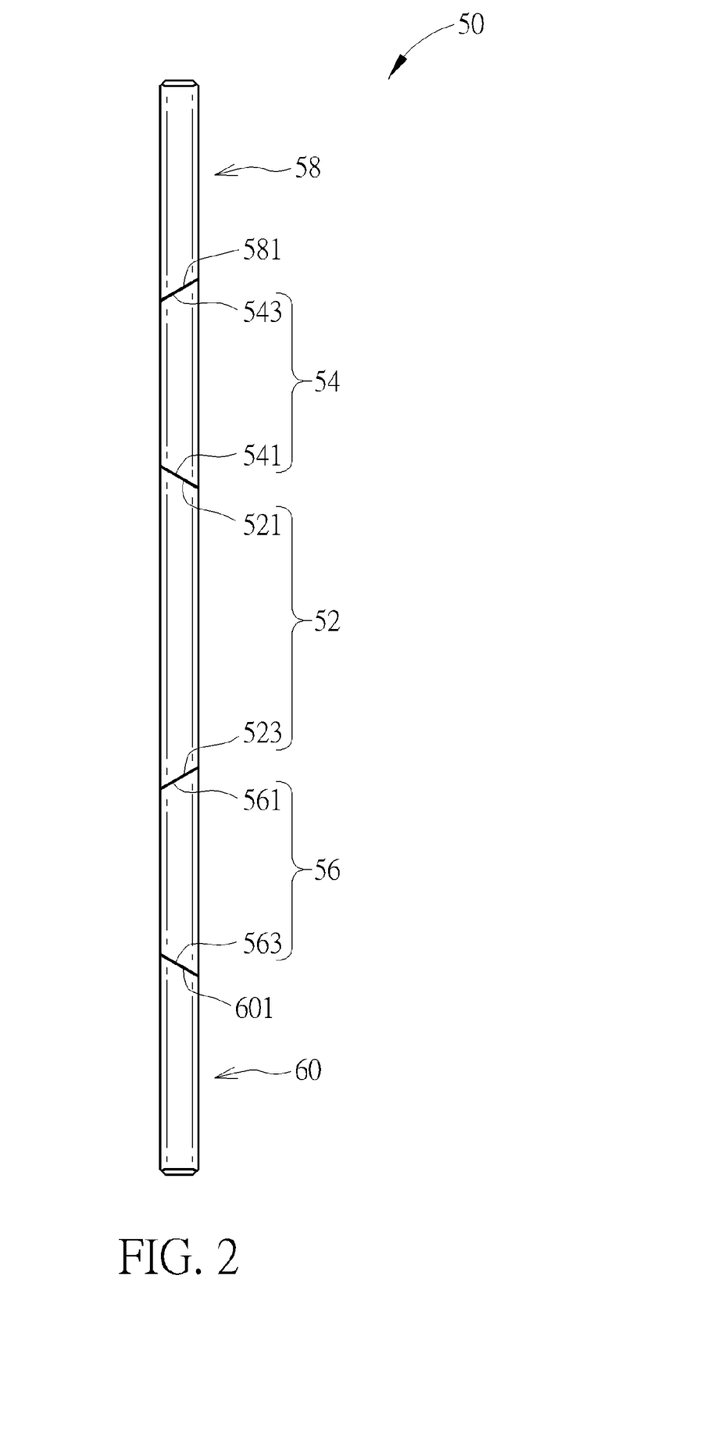
Figure 3:
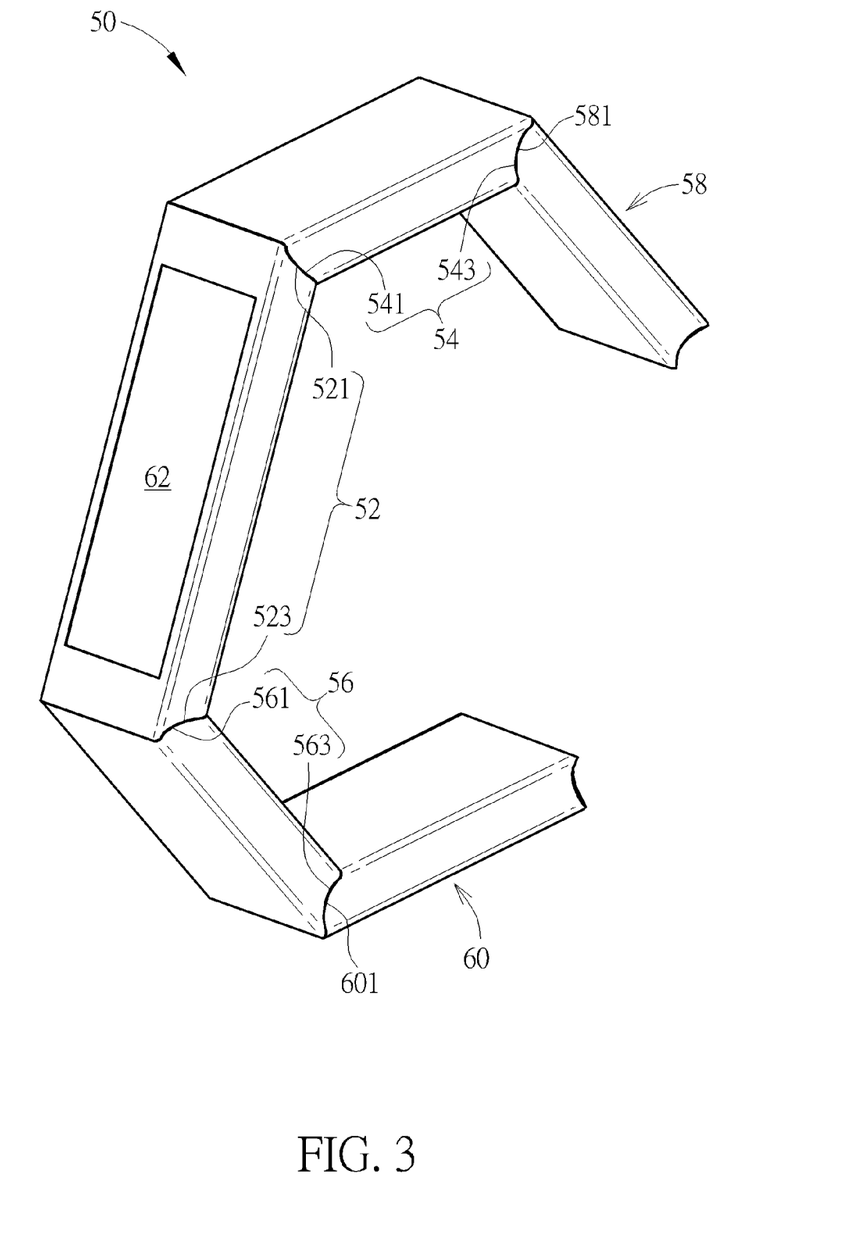
FIG. 3 and FIG. 4 are respectively a schematic diagram and a lateral view of the wearable electronic device in another using status according to the embodiment of the present invention.
Figure 4:
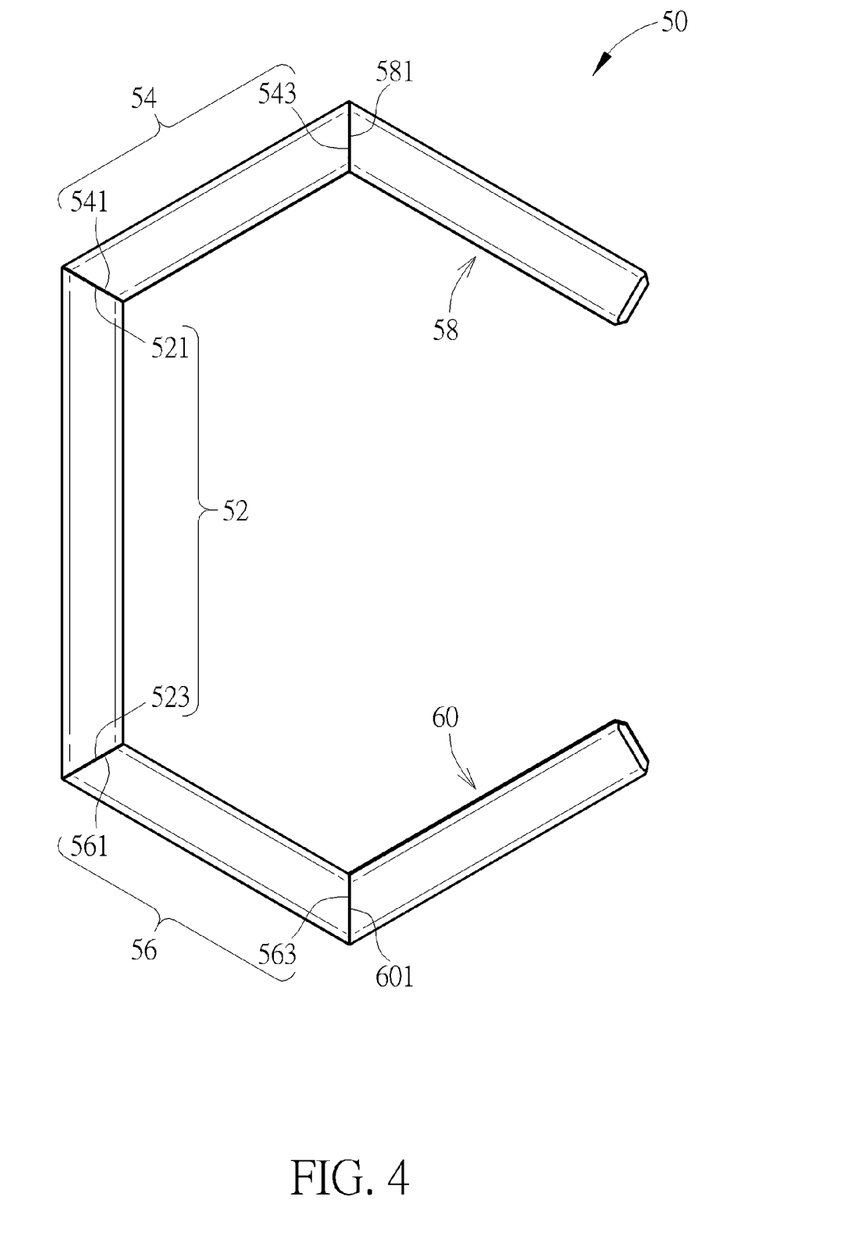

Please refer to FIG. 1 to FIG. 4. FIG. 1 and FIG. 2 are respectively a schematic diagram and a lateral view of a wearable electronic device 50 in a using status according to an embodiment of the present invention. FIG. 3 and FIG. 4 are respectively a schematic diagram and a lateral view of the wearable electronic device 50 in another using status according to the embodiment of the present invention. The wearable electronic device 50 can be a smart communication device for communication. The wearable electronic device 50 can include five trapezoid structures according to this embodiment. However, a number of the trapezoid structures is not limited to this embodiment, and it depends on practical requirements. The wearable electronic device 50 includes a first trapezoid structure 52, a second trapezoid structure 54, a third trapezoid structure 56, a fourth trapezoid structure 58 and a fifth trapezoid structure 60. The trapezoid structures are rotatably connected with one another.

A first inclined surface 521 and a second inclined surface 523 are respectively formed on two ends of the first trapezoid structure 52. A third inclined surface 541 and a fourth inclined surface 543 are respectively formed on two ends of the second trapezoid structure 54, and the third inclined surface 541 of the second trapezoid structure 54 abuts against the first inclined surface 521 of the first trapezoid structure 52. A fifth inclined surface 561 and a sixth inclined surface 563 are respectively formed on two ends of the third trapezoid structure 56, and the fifth inclined surface 561 of the third trapezoid structure 56 abuts against the second inclined surface 523 of the first trapezoid structure 521. A seventh inclined surface 581 is formed on an end of the fourth trapezoid structure 58, and the seventh inclined surface 581 of the fourth trapezoid structure 58 abuts against the fourth inclined surface 543 of the second trapezoid structure 54. An eighth inclined surface 601 is formed on an end of the fifth trapezoid structure 60, and the eighth inclined surface 601 of the fifth trapezoid structure 60 abuts against the sixth inclined surface 563 of the third trapezoid structure 56. End surfaces of the fourth trapezoid structure and the fifth trapezoid structure can respectively be a plane or an inclined surface, and it depends on practical requirements.

Figure 5:
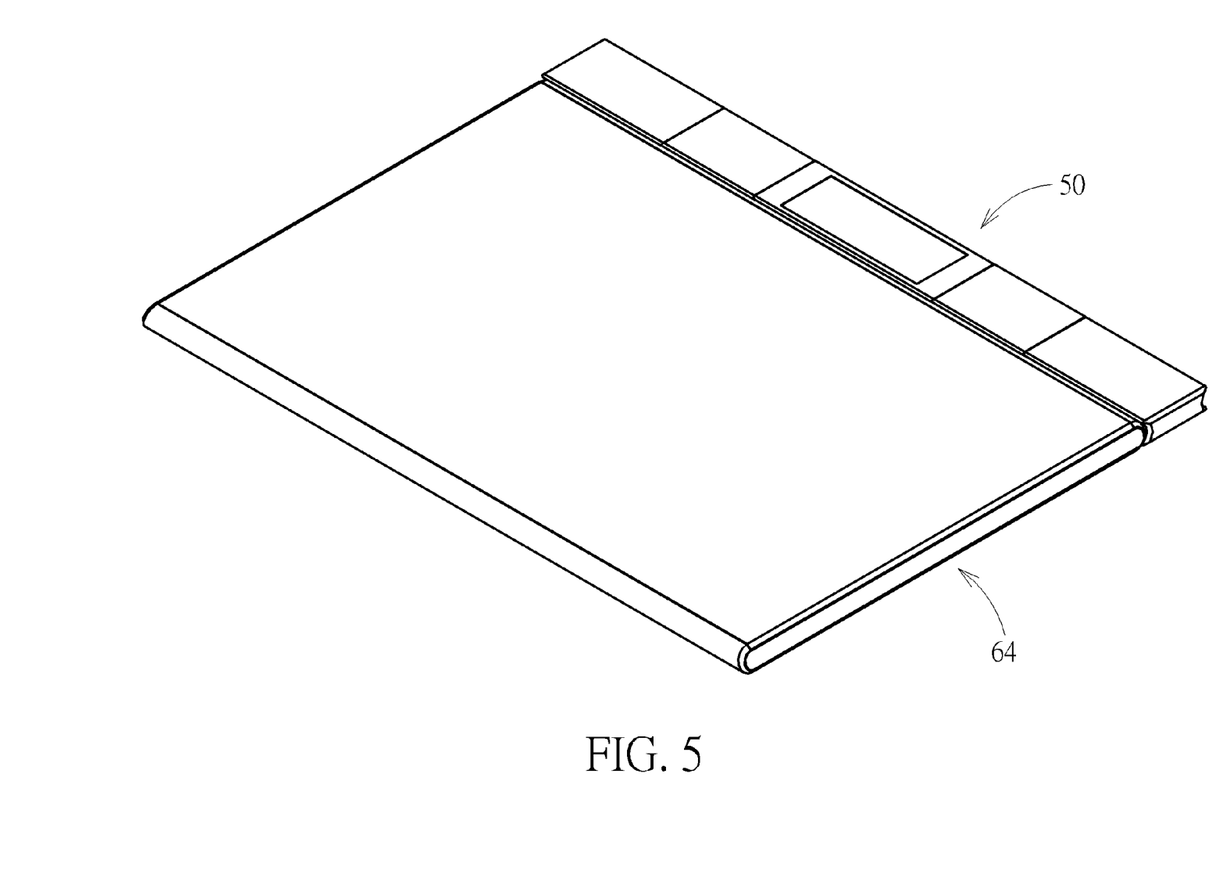
FIG. 5 is a diagram of the wearable electronic device in a straight shape and connected with a portable electronic device according to the embodiment of the present invention.

The first trapezoid structure 52, the second trapezoid structure 54, the third trapezoid structure 56, the fourth trapezoid structure 58 and the fifth trapezoid structure 60 are rotatably connected to one another, and the first trapezoid structure 52, the second trapezoid structure 54, the third trapezoid structure 56, the fourth trapezoid structure 58 and the fifth trapezoid structure 60 can be formed in a straight shape as rotating to the using status as shown in FIG. 1 and FIG. 2. Please refer to FIG. 5. FIG. 5 is a diagram of the wearable electronic device 50 in the straight shape and connected with a portable electronic device 64 according to the embodiment of the present invention. The portable electronic device 64 can be a tablet computer device or a smartphone device. The wearable electronic device 50 can be fixed on the portable electronic device by different connecting mechanisms, such as a magnetically connecting mechanism, as being formed in the straight shape. The wearable electronic device 50 can be an extension peripheral device of the portable electronic device 64 for providing a speaking function, a call feature, internet communication, fingerprint identification, an extension storage function, or a cloud key function. An appearance of the portable device 64 connected with the straight shaped wearable electronic device 50 is formed in a rectangular shape so as to keep aesthetic feeling. In addition, the wearable electronic device 50 further includes a display module 62 installed in one of the plurality of trapezoid structures, such as in the first trapezoid structure 52, to be an interface for displaying the processing information of the wearable electronic device 50.

In addition, as the second trapezoid structure 54 and the third trapezoid structure 56 respectively rotate 180 degrees relative to the first trapezoid structure 52 from the status as shown in FIG. 1 and FIG. 2, the fourth trapezoid structure 58 rotates 180 degrees relative to the second trapezoid structure 54 from the status as shown in FIG. 1 and FIG. 2, and the fifth trapezoid structure 60 rotates 180 degrees relative to the third trapezoid structure 56 from the status as shown in FIG. 1 and FIG. 2, the first trapezoid structure 52, the second trapezoid structure 54, the third trapezoid structure 56, the fourth trapezoid structure 58 and the fifth trapezoid structure 60 are switched from the straight shape to a ring shape as shown in FIG. 3 and FIG. 4. The wearable electronic device 50 can be a smart watch, a bracelet or an accessory for being worn on a wrist and easy carriage. The wearable electronic device 50 can just include a simple call feature and message function, so as to be worn easily and for communication.

Figure 6:
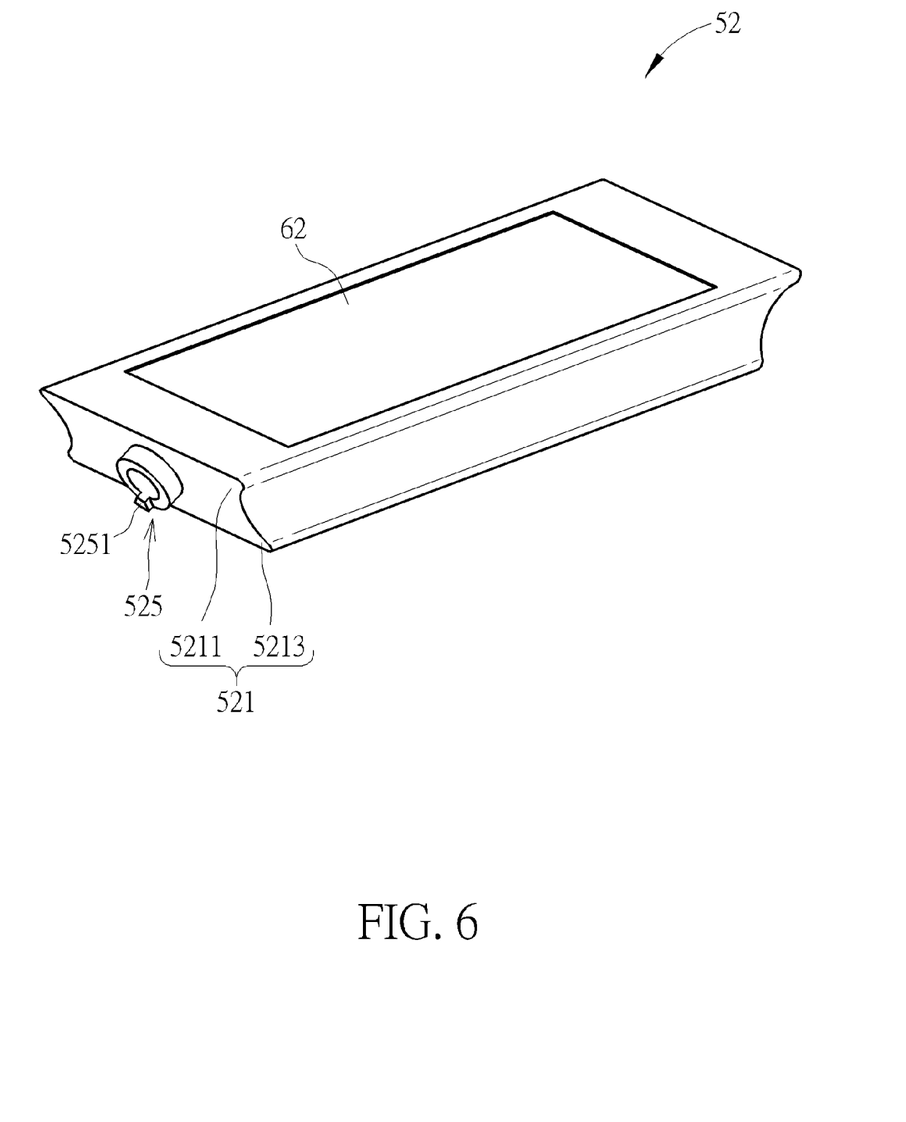
FIG. 6 is a diagram of a first trapezoid structure according to the embodiment of the present invention.
Figure 7:
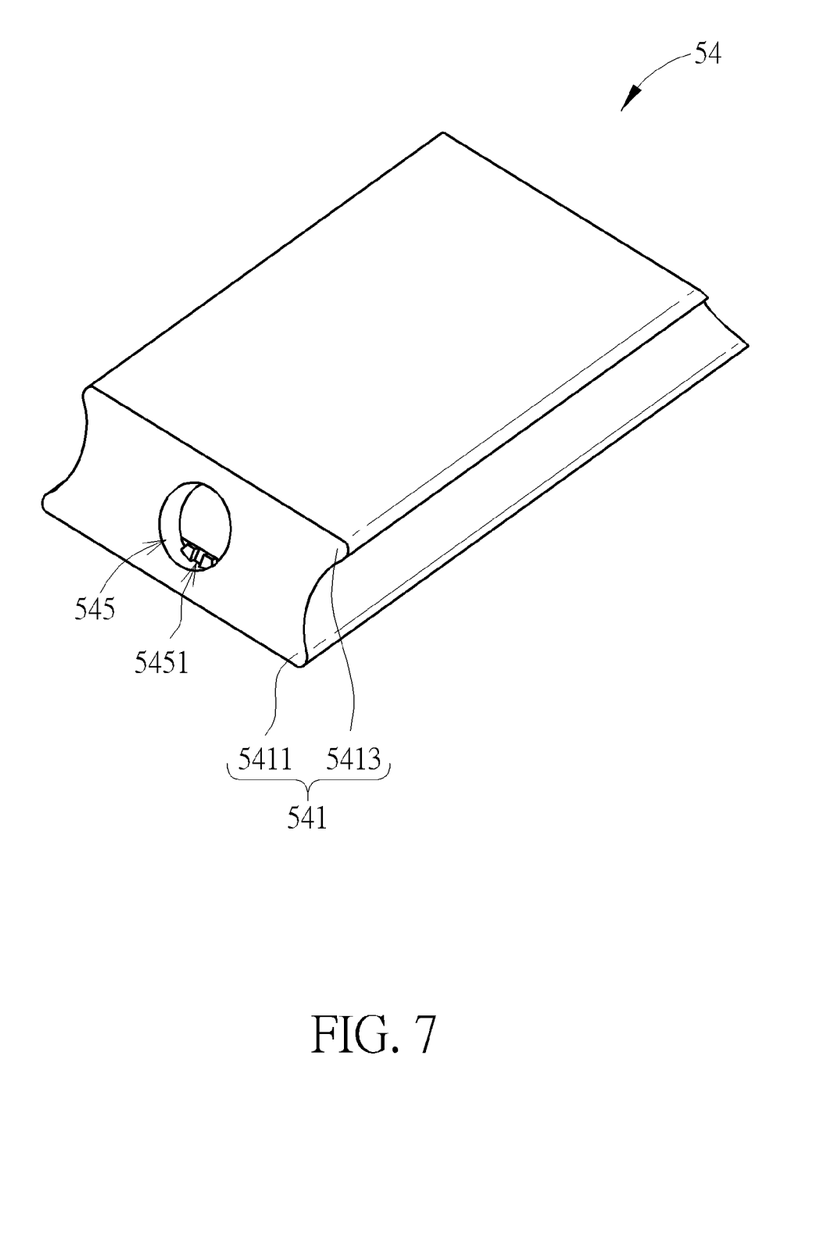
FIG. 7 is a diagram of a second trapezoid structure according to the embodiment of the present invention.
Figure 8:
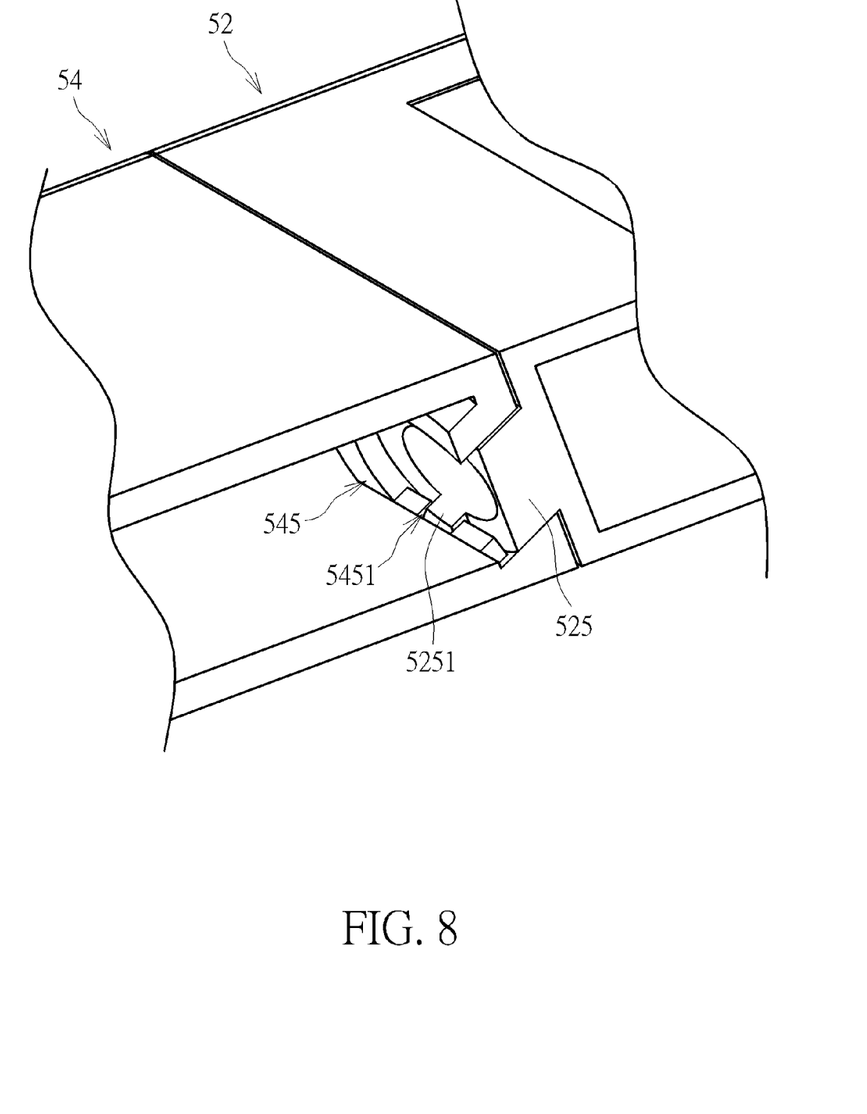
FIG. 8 is a cross-sectional diagram of the first trapezoid structure connected with the second trapezoid structure according to the embodiment of the present invention.
Figure 9:
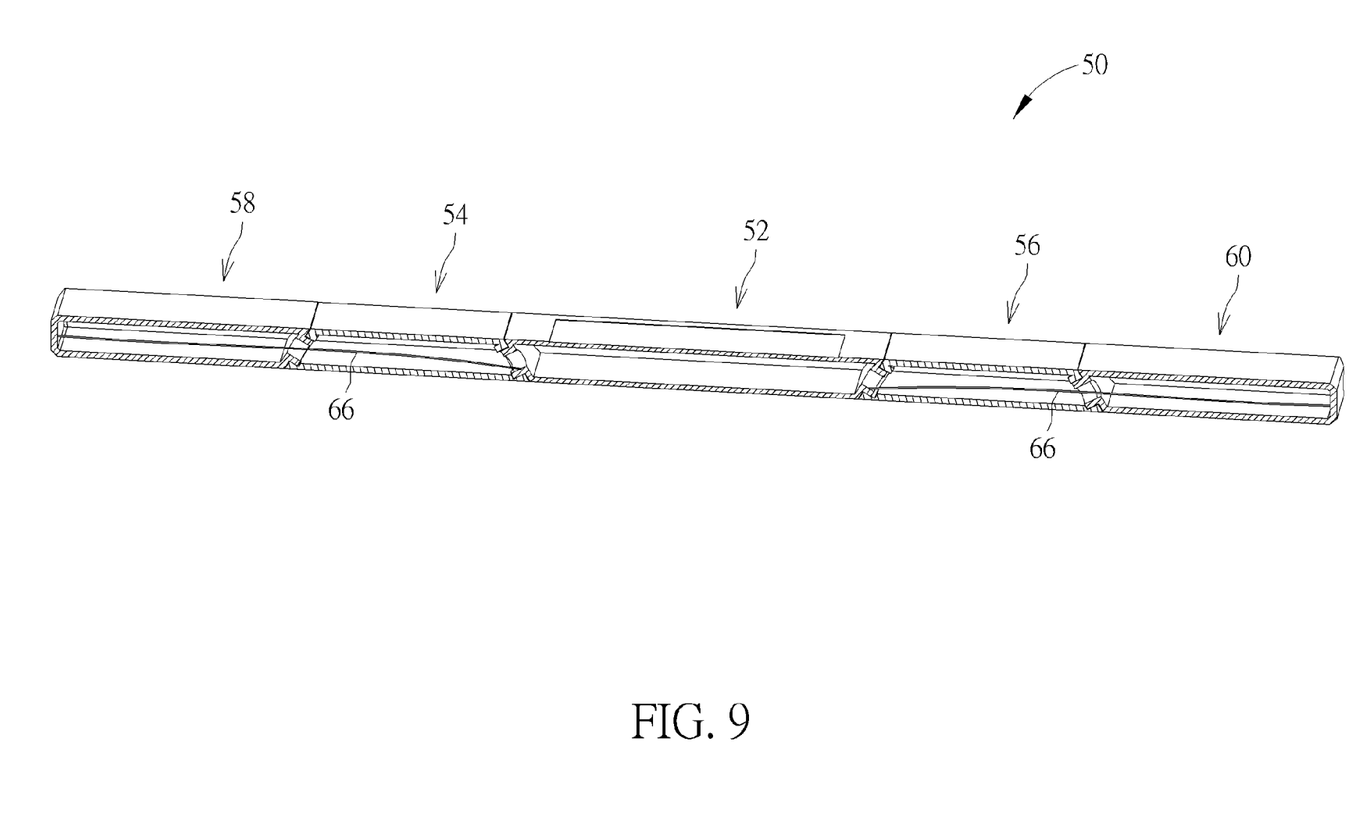
FIG. 9 is a cross-sectional diagram of the wearable electronic device according to the embodiment of the present invention.

Please refer to FIG. 6 to FIG. 9. FIG. 6 is a diagram of the first trapezoid structure 52 according to the embodiment of the present invention. FIG. 7 is a diagram of the second trapezoid structure 54 according to the embodiment of the present invention. FIG. 8 is a cross-sectional diagram of the first trapezoid structure 52 connected with the second trapezoid structure 54 according to the embodiment of the present invention. FIG. 9 is a cross-sectional diagram of the wearable electronic device 50 according to the embodiment of the present invention. The detailed description of connection of the trapezoid structures is described as follows. As shown in FIG. 9, an engaging portion is respectively disposed on two ends of each of the first trapezoid structure 52, the second trapezoid structure 54 and the third trapezoid structure 56, and on an end of each of the fourth trapezoid structure 58 and the fifth trapezoid structure 60 for engaging with an adjacent engaging portion of the adjacent trapezoid structure, so as to fix the first trapezoid structure 52, the second trapezoid structure 54, the third trapezoid structure 56, the fourth trapezoid structure 58 and the fifth trapezoid structure 60. The engaging portion can be an annular rib or an annular concave. As shown in FIG. 6 to FIG. 8, the first trapezoid structure 52 is connected to the second trapezoid structure 54, an engaging component 525 is disposed on an end of the first trapezoid structure 52, and a positioning component 5251 is formed on the engaging component 525. An engaging component 545 is disposed on an end of the second trapezoid structure 54, and at least one positioning component 5451 is formed on the engaging component 545. In this embodiment, the engaging component 525 of the first trapezoid structure 52 is an annular rib and the positioning component 5251 is a protrusion, the engaging component 545 of the second trapezoid structure 54 is an annular concave and the positioning component 5451 is a notch structure, and the annular rib is engaged with the annular concave and the positioning component 5251 can be fixed in the positioning component 5451 as the first trapezoid structure 52 abuts against the second trapezoid structure 54. Hence, the first trapezoid structure 52 and the second trapezoid structure 54 can be fixed together. The present invention is not limited to this. For example, the second trapezoid structure 54 can include two notch structures disposed opposite and faced to each other. As the first trapezoid structure 52 and the second trapezoid structure 54 are located at positions as shown in FIGS. 1, 2 and FIGS. 3, 4, the positioning component 5251 of the first trapezoid structure 52 is fixed with the different positioning components 5451 of the second trapezoid structure 54, so as to fix the wearable electronic device 50 in different statuses.

In addition, as shown in FIG. 1 and FIG. 2, when a protruding side 5211 of the first surface 521 of the first trapezoid structure 52 abuts against a sunken side 5413 of the third surface 541 of the second trapezoid structure 54, and a sunken side 5213 of the first surface 521 of the first trapezoid structure 52 abuts against a protruding side 5411 of the third surface 541 of the second trapezoid structure 54, the first trapezoid structure 52 and the second trapezoid structure 54 are parallel to each other. The protruding sides and the sunken sides of the first inclined surface 521 and the third inclined surface 541 abut against each other, protruding sides and sunken sides of the second inclined surface 523 and the fifth inclined surface 561 abut against each other, protruding sides and sunken sides of the fourth inclined surface 543 and the seventh inclined surface 581 abut against each other, and protruding sides and sunken sides of the sixth inclined surface 563 and the eighth inclined surface 601 abut against each other, the first trapezoid structure 52, the second trapezoid structure 54, the third trapezoid structure 56, the fourth trapezoid structure 58 and the fifth trapezoid structure 60 are formed in the straight shape. It is to say, when the protruding sides and the sunken sides of the adjacent inclined surfaces of the adjacent trapezoid structures abut against each other, the plurality of trapezoid structures is formed in the straight shape.

On the other hand, as shown in FIG. 3 and FIG. 4, when the protruding sides of the first inclined surface 521 of the first trapezoid structure 52 and the third inclined surface 541 of the second trapezoid structure 54 abut against each other and the sunken sides of the first inclined surface 52 and the third inclined surface 541 abut against each other, the protruding sides of the second inclined surface 523 and the fifth inclined surface 561 abut against each other and the sunken sides of the second inclined surface 523 and the fifth inclined surface 561 abut against each other, the protruding sides of the fourth inclined surface 543 and the seventh inclined surface 581 abut against each other and the sunken sides of the fourth inclined surface 543 and the seventh inclined surface 581 abut against each other, and the protruding sides of the sixth inclined surface 563 and the eighth inclined surface 601 abut against each other and the sunken sides of the sixth inclined surface 563 and the eighth inclined surface 601 abut against each other, the first trapezoid structure 52, the second trapezoid structure 54, the third trapezoid structure 56, the fourth trapezoid structure 58 and the fifth trapezoid structure 60 are formed in the ring shape. It is to Say, when protruding sides of the adjacent inclined surfaces of the adjacent trapezoid structures abut against each other and sunken sides of the adjacent inclined surfaces of the adjacent trapezoid structures abut against each other, the plurality of trapezoid structures is formed in the ring shape.

In addition, as shown in FIG. 9, the wearable electronic device further includes two resilient components 66 respectively connected with the first trapezoid structure 52 and the fourth trapezoid structure 58, and connected with the first trapezoid structure 52 and the fifth trapezoid structure 60. That is, the resilient components 66 are connected with a trapezoid structure on a central portion of the plurality of trapezoid structures and trapezoid structures on ends of the plurality of trapezoid structures. When switching the wearable electronic device 50 between the straight shape and the ring shape, the second trapezoid structure 54, the third trapezoid structure 56, the fourth trapezoid structure 58 and the fifth trapezoid structure 60 are pulled out from the first trapezoid structure 52 on the central portion, and the engaging portions of the trapezoid structures are separated from each other. Hence, the adjacent trapezoid structures can rotate relative to each other so as to switch a shape of the wearable electronic device 50. After switching the shape, the pulled trapezoid structures can be released and the resilient components 66 can drive outer trapezoid structures to move inwardly to the first trapezoid structure 52 on the central portion, so as to tightly engage the trapezoid structures with each other.

In contrast to the prior art, the wearable electronic device of the present invention can switch between the straight shape and the ring shape through the different connection of the plurality of trapezoid structures. The wearable electronic device can be connected with another portable electronic device as the extension peripheral device of the portable electronic device, as being formed in the straight shape. The appearance of the portable device connected with the straight-shaped wearable electronic device is formed in a rectangular shape so as to keep aesthetic feeling. In addition, the wearable electronic device can be formed in the ring shape to be a smart watch, a bracelet or an accessory for being worn on a wrist and easy carriage. The wearable electronic device of the present invention is transformable, and the competitiveness of the wearable electronic device is enhanced.

Those skilled in the art will readily observe that numerous modifications and alterations of the device and method may be made while retaining the teachings of the invention.

Accordingly, the above disclosure should be construed as limited only by the metes and bounds of the appended claims.

What is claimed is:

1. A transformable wearable electronic device, comprising a plurality of trapezoid structures arranged in a connecting axial direction and connected with one another in a twistable manner relative to the connecting axial direction, at least one inclined surface being formed on two ends of each trapezoid structure, the plurality of trapezoid structures being formed in a ring shape when protruding sides of adjacent inclined surfaces of adjacent trapezoid structures abut against each other and sunken sides of the adjacent inclined surfaces of the adjacent trapezoid structures abut against each other, and the plurality of trapezoid structures being formed in a straight shape when the protruding sides and the sunken sides of the adjacent inclined surfaces of the adjacent trapezoid structures abut against each other.

2. The wearable electronic device of claim 1, wherein at least one engaging portion is disposed on two ends of each trapezoid structure for engaging with engaging portions of the adjacent trapezoid structures, so as to fix the plurality of trapezoid structures.

3. The wearable electronic device of claim 2, wherein the engaging portion is an annular rib or an annular concave, and at least one positioning component is formed on the engaging portion.

4. The wearable electronic device of claim 1, further comprising at least one resilient component connected with a trapezoid structure on a central portion of the plurality of trapezoid structures and a trapezoid structure on an end of the plurality of trapezoid structures.

5. The wearable electronic device of claim 1, further comprising a display module installed on one of the plurality of trapezoid structures.

6. The wearable electronic device of claim 1, wherein the plurality of trapezoid structures comprises:
  a first trapezoid structure, a first inclined surface and a second inclined surface being respectively formed on two ends of the first trapezoid structure;
  a second trapezoid structure, a third inclined surface and a fourth inclined surface being respectively formed on two ends of the second trapezoid structure, and the third inclined surface of the second trapezoid structure abutting against the first inclined surface of the first trapezoid structure;
  a third trapezoid structure, a fifth inclined surface and a sixth inclined surface being respectively formed on two ends of the third trapezoid structure, and the fifth inclined surface of the third trapezoid structure abutting against the second inclined surface of the first trapezoid structure;
  a fourth trapezoid structure, a seventh inclined surface being formed on an end of the fourth trapezoid structure, and the seventh inclined surface of the fourth trapezoid structure abutting against the fourth inclined surface of the second trapezoid structure; and
  a fifth trapezoid structure, an eighth inclined surface being formed on an end of the fifth trapezoid structure, and the eighth inclined surface of the fifth trapezoid structure abutting against the sixth inclined surface of the third trapezoid structure;

wherein, when protruding sides of the first inclined surface and the third inclined surface abut against each other and sunken sides of the first inclined surface and the third inclined surface abut against each other, protruding sides of the second inclined surface and the fifth inclined surface abut against each other and sunken sides of the second inclined surface and the fifth inclined surface abut against each other, protruding sides of the fourth inclined surface and the seventh inclined surface abut against each other and sunken sides of the fourth inclined surface and the seventh inclined surface abut against each other, and protruding sides of the sixth inclined surface and the eighth inclined surface abut against each other and sunken sides of the sixth inclined surface and the eighth inclined surface abut against each other, the first trapezoid structure, the second trapezoid structure, the third trapezoid structure, the fourth trapezoid structure and the fifth trapezoid structure are formed in the ring shape, and when the protruding sides and the sunken sides of the first inclined surface and the third inclined surface abut against each other, the protruding sides and the sunken sides of the second inclined surface and the fifth inclined surface abut against each other, the protruding sides and the sunken sides of the fourth inclined surface and the seventh inclined surface abut against each other, and the protruding sides and the sunken sides of the sixth inclined surface and the eighth inclined surface abut against each other, the first trapezoid structure, the second trapezoid structure, the third trapezoid structure, the fourth trapezoid structure and the fifth trapezoid structure are formed in the straight shape.

7. The wearable electronic device of claim 6, wherein engaging portions are respectively disposed on two ends of each of the first trapezoid structure, the second trapezoid structure, the third trapezoid structure and on an end of each of the fourth trapezoid structure and the fifth trapezoid structure for engaging with engaging portions of the adjacent trapezoid structures, so as to fix the first trapezoid structure, the second trapezoid structure, the third trapezoid structure, the fourth trapezoid structure and the fifth trapezoid structure.

8. The wearable electronic device of claim 7, wherein the engaging portion is an annular rib or an annular concave, and at least one positioning component is formed on the engaging portion.

9. The wearable electronic device of claim 6, further comprising at least one resilient component connected with the first trapezoid structure and the fourth trapezoid structure or the fifth trapezoid structure.

10. The wearable electronic device of claim 6, further comprising a display module installed on the first trapezoid structure.

* * * * *